Dec. 25, 1934. A. L. MURRAY 1,985,578
RUBBER SOLE AND HEEL
Filed Sept. 15, 1933
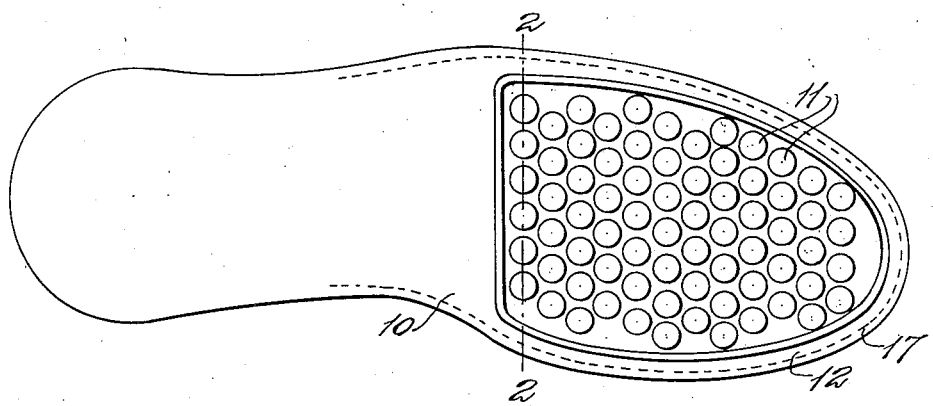
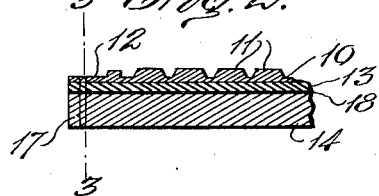 
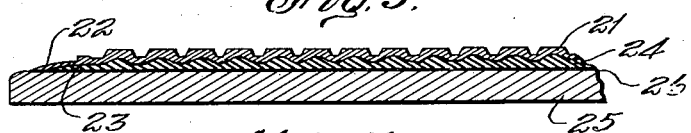
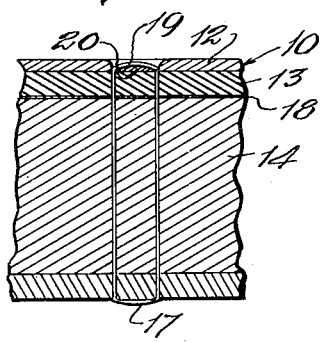 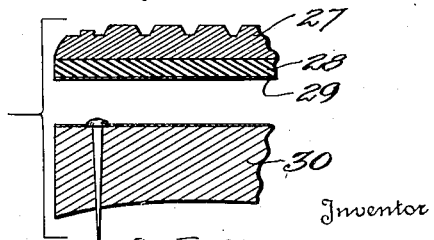
Inventor
A. L. Murray,
By
Attorney Patented Dec. 25, 1934

1,985,578

UNITED STATES PATENT OFFICE 1,985,578

RUBBER SOLE AND HEEL

Albert L. Murray, Auburn, Ind.

Application September 15, 1933, Serial No. 689,647

13 Claims. (Cl. 36—32)

This invention relates to rubber soles and heels, particularly of the type composed of a plurality of layers superposed one on the other.

In the manufacture of rubber soles and heels it is very desirable that the ground contacting surface be of highly resilient rubber with as little admixture of fillers and the like as possible. Such rubber not only has a semi-transparent appearance and an attractive color but also possesses great cushioning effect and has much durability against wear. However, difficulties arise in connection with the use of shoe soles and heels where this type of rubber forms the entire article.

In the first place such rubber tends to spread under pressure such as is produced in walking and also has such a degree of elasticity that it is difficult to keep it from stretching out of shape during application and further stretching when under the pressure of use, with the then result of causing separation when attached to any less elastic material. Attempts have been made to prevent this flow and stretching by providing a fabric backing for the rubber. This, however, introduces other objectionable features such as increasing the cost of production, adding manufacturing difficulties and making its incorporation with a shoe more difficult.

It is a well recognized fact that rubber compositions may be formed which will resist flow and have little stretch but such compositions, due to their hardness, lack the high cushioning and wearing qualities of the practically pure rubber before mentioned.

One important object of the present invention is to produce a novel shoe sole or heel having the high cushioning and wear resistance of pure rubber combined with the absence of flow or stretch of the harder composition rubber and which will be well adapted for use equally in the manufacture of shoes with rubber heels or heels and soles and in the repairing of shoes and the like.

In the attainment of this object the present invention provides a heel or sole having a ground contacting or tread layer of the softer practically pure rubber and a backing layer of the harder composition rubber vulcanized to the tread layer.

In the manufacture of leather or part leather shoes provided with rubber soles it is desirable from the point of appearance and salability that the rubber part of the sole should be flush with the edge of the leather shoe bottom and should be capable of being rendered smooth by buffing. The rubber sole with a fabric backing is entirely unsuitable for this purpose since such fabric backing frays out at the edges under buffing and presents an extremely unsightly appearance so that the shoes are unsalable. It is also not possible to produce a smooth edge on the practically pure soft rubber above mentioned by buffing and it is accordingly undesirable that any appreciable thickness of the softer rubber should be visible. At the same time the softer rubber with its great cushioning property should be sufficiently thick to effect proper cushioning when walking.

A second important object of the invention is to produce an improved shoe sole which will be coterminous with the leather shoe bottom to which it is attached while free from fraying and capable of being buffed to smoothness at its edge.

In the attainment of this object the present invention provides a rubber shoe sole having a backing layer of harder composition rubber, which preferably is flush with the edge of the shoe bottom and may be buffed smooth, and having a tread layer whereof the edge portion is relatively thin and the tread portion proper is of relatively great thickness.

In the manufacture of shoes with rubber soles it is, as mentioned above, desirable that the rubber of the sole should be flush with the edge of the shoe bottom. If the rubber is not firmly secured to the leather around the edge, where it is subjected to blows, it will tend to separate from the leather at such edge. Cement alone, no matter how carefully applied, has been found inadequate to hold the rubber to the shoe bottom at such edges. It has been found, therefore, practically essential that, at the edges, the rubber sole be attached to the shoe bottom by sewing, nailing or both. No especial difficulty is experienced in sewing the harder compositions to the shoe bottom since the stitches may be drawn tight without cutting into the rubber. However, if a softer rubber be sewn through and the thickness of the softer rubber be more than very slight the tension under which the stitches can be drawn is not sufficient to compress the rubber under the stitch loops into practically unyielding portions. Consequently, as the shoe is used in walking there will be yielding of the stitches as the rubber moves and this will produce a sawing action on the rubber beneath the stitch loops which will quickly cut through such rubber.

A third object of the invention is to produce an improved rubber sole for shoes, which sole may be secured at its edge to a shoe bottom by stitching or sewing without danger of the stitches pulling or sawing through the rubber and this object may be attained by the provision of a rubber sole of the same character as is necessary to attain the second mentioned object of this invention.

The shoe sole fulfilling these objects is thus composed of a backing layer which goes next to the shoe, this layer being of such composition as will provide good holding power for sewing or nailing and a second or tread layer which forms the ground contacting layer which is of a character to provide the greatest durability and the best feeling of softness and elasticity in use as well as high non-slip properties.

My invention makes a definite improvement in each of the above layers, resulting in greatly improved durability and, therefore, economy in shoes, combined with a marked improvement in the comfort feel of the shoe and also combined in an improved holding power of the threads or nails.

For example, many actual wear tests using the sole of one composition on one shoe against a sole of a different composition on the other shoe has clearly proved that what I term 100% pure rubber sole gives twice the wear of soles classed as fine quality but which necessarily must use considerable amounts of other materials because of lack of the particular construction which this invention will disclose. By a 100% pure rubber, I mean a sole made of a mixture of approximately 100 pounds of new rubber, one pound of zinc, two pounds of sulphur and one-quarter pound of an accelerator, the whole cured to a high degree of firmness as to its texture and producing a sole of a semi-transparent appearance which shows its rubber pureness by such transparent appearance. By a standard high quality sole covering all the best soles I know of, I refer to a sole in which there may be no effort to reduce cost as to the use of pure rubber but which because of the necessity of producing a hardness adaptable to holding a sole on by sewing is made by the mixing in of materials (usually 20 to 30%) of such hardeners as zinc, magnesia, carbon, iron oxide, clay, lime, and/or cotton. The purpose of such materials being to produce a hardness of 70 to 80% of complete hardness for sport soles and of 80 to 85% for standard work shoes, these being the hardnesses the shoe factories require and have found necessary to successfully hold their soles on by sewing and/or nails.

My 100% pure rubber soles has a hardness of approximately 45%. Its extreme durability is partly due to the tough and tightly cured nature of my pure rubber and its lack of anything of a granular nature, and also because its softness makes it cling under pressure, and therefore greatly reduces the abrasion due to slipping.

While it can be readily understood that a practically pure rubber sole having a hardness of about 45% gives a delightful soft elastic feel markedly superior to a comparatively hard sole such as seventy to eighty percent, yet this pure rubber sole would normally be unpractical since its softness allows stitches to draw down so deep into the rubber that movement occurs in the flexing of the shoe resulting either in the rubber being cut or the threads breaking.

My invention, therefore, primarily consists of a method of building soles by which I obtain much of the extra durability, comfort and less slip advantage of the 100% pure rubber and yet provide an anchorage for sewing or nails equal or superior to that obtained by any of the harder type soles.

I preferably accomplish this result as follows:

First I design my mold so the sole will be thinner around the side portions where sewing is to be done and thicker over the tread portion where most of the wear comes.

Next I calender my hard or upper layer of rubber composition of such a thickness as will make it nearly as thick as that part of the sole which is to be sewed, and because of the hard nature of this stock I find that this thickness will be closely retained in the finished sole.

I then run this hard stock again through the calender giving it a skim coat or a sheet of my pure rubber stock of such thickness as under mold pressure I find will leave only a thin amount of this pure rubber such as a $\frac{1}{32}$ or $\frac{1}{16}$ thickness over that part of the sole which is to be sewed, the two stocks being joined inseparably by the calender operation and yet provide enough of the pure rubber to fill out the tread portion and to cover the shank and heel portion.

I then die my sole out to the shape of the mold and cure it under the regular heat and pressure. In doing this the fact that the softer pure rubber flows easiest reduces the thickness of the pure rubber where the mold cavity has purposely been made thin over the surface of the sole where the sewing or nailing would occur. This thinning occurs even though my pure rubber thickness in the sheet may be materially thicker than the desired thickness in the finished article. My pure rubber thickness at the thin part is made sufficient to fill up all buttons, bosses or similar raised members of my tread design. I thus obtain a greater thickness of the tread portion of the raw rubber stock than the calendered thickness combined with less thickness round the sewable portions, the two balancing each other.

To provide a still further holding power and to relieve the strain on sewing or nails, I commonly put on either a thin sheet of pure raw rubber or a film of rubber cement applied before vulcanization to the exposed face of the harder of my two layers of rubber. This third sheet or film is produced either under my U. S. Patent 1,624,500 issued Apr. 12, 1927, or under my copending application filed Apr. 25, 1932, Serial No. 607,487. The purpose of this third sheet is that on one side it will become inseparably united with the sole while the other side will remain tacky or cement receptive so that when the sole is cemented on to the shoe bottom it will be firmly attached all over and thus relieve the strain on the sewing around the edges.

In the accompanying drawing like characters of reference indicate like parts in the several views, and:

Figure 1 is a bottom plan view of a full rubber sole constructed in accordance with this invention.

Figure 2 is an enlarged detail section of such a sole on the line 2—2 of Figure 1 and showing the sole applied to a shoe sole.

Figure 3 is a greatly enlarged section slightly modified on the line 3—3 of Figure 2.

Figure 4 is a section similar to Figure 2 but showing a full thickness rubber sole applied to a shoe bottom.

Figure 5 is a section similar to Figure 2 but showing a rubber repair sole applied to a shoe sole.

Figure 6 is a partly exploded or partly disassembled view of the form of the invention as used in connection with a shoe heel.

Figure 7 is a section through a portion of a further modification of the invention.

In the forms of the invention shown in Figures 1 to 4 there has been disclosed certain applications of the improved soles to shoes and the like during manufacture of the shoes. In these forms the rubber sole consists of a lower or tread layer 10 of the softer form of rubber and it is to be noted that this layer is provided beneath the ball and forward part of the foot with a series of studs or bosses 11, thus giving the part of the shoe supporting the forward part of the foot cushioning means of considerable thickness. This layer has the shank and heel portions made relatively thin and the peripheral margin of the forward part of the rubber sole has this layer of marked thinness as at 12. It is especially to be noted that the curing of this soft layer is carried out until the layer becomes what is known in the art as "tight". That is to say the curing is of such a nature as contracts the molecular structure of the rubber into a rubber of extreme density which resists any tendency to elongate or spread under pressure without its immediately resuming the original form when the pressure is removed and this adds greatly to the wear resisting quality of the rubber.

The rubber employed in this layer is thus of a different character and possesses properties not possessed by either raw crepe rubber sometimes used for shoe soles and heels or by cured rubber mixed with hardening materials of a non-elastic material such as commonly used for shoe soles and heels.

The backing layer is made of the harder composition rubber above mentioned and if the finished sole is to include a leather layer of considerable thickness having a relatively thin rubber sole thereon, as in Figures 2 and 3, the backing layer 13 is made thin so that, when the rubber sole is affixed to the leather sole 14 the total thickness of rubber and leather will be suitable for the type of shoe manufactured.

In Figure 4 is shown a modification wherein the sole is what is known as an all rubber sole. In this case the shoe bottom 15 is of the usual thin form but the backing layer 16 of the harder rubber is made of such thickness as to bring the sole to the normal or desired thickness for the type of shoe being manufactured.

In these forms the forward marginal portion of the rubber sole is stitched to the shoe by stitching 17 and preferably the backing layer has its shoe contacting face covered with a thin layer or film 18 of raw, unvulcanized rubber of cement receptive character so that the entire rubber sole may be cemented to the shoe.

The results of the stitching operation are disclosed in Figure 3 which shows one stitch extending through the rubber and leather of a shoe sole. It will here be seen that the stitch loop 19 acts, when pulled down in sewing, on the material of the layer 10 to so compress this material between the sides of the stitch and between the loop and the composition layer 13 as to form a body 20 of compressed and substantially unyielding rubber. Since the layer 10 is so thin at the margin this can be accomplished but it will be noted that if the layer 10 is of greater thickness there will still be only the same extent of draw on the thread since the tension is regulated by the sewing machine and cannot exceed a certain amount without breaking the thread.

Consequently, if there is a considerable mass of yieldable rubber under the thread loop this mass cannot be compressed enough by the sewing action to prevent further yielding. The result, under such conditions, is that walking on the shoe will effect such further compression of the rubber at this point that the thread will slacken and work to and fro relative to the rubber beneath the loop and will rapidly cut through the soft rubber. This will leave the stitches loose and ineffective, even when the harder layer is considered, to hold the marginal portion of the rubber sole firmly in place on the shoe. It will now be plain that it is essential that the marginal portion of the cushioning layer must be of very thin nature while the harder layer may be of any desired thickness.

In the form of the invention shown in Figure 5 there is disclosed a repair sole such as is used to half sole worn shoes although it is obvious that such a repair sole may also be used on new shoes to produce the effect of a factory built rubber soled shoe. In this form the tread layer 21 has the usual thin marginal portion 22 but preferably the marginal portion 23 of the backing layer 24 is also tapered down. Further, the marginal portion 22 may, if desired, extend over the edge of the marginal portion 23 so as to lie flat against the shoe leather 25. The feather edge thus formed on the rubber sole thus eliminates the chance of the rubber sole being loosened by blows against its edge. In this form there is also preferably provided a layer 26 of cement receptive rubber forming a facing for that side of the rubber sole which lies next the shoe sole and this layer permits the rubber sole to be securely attached to the shoe by means of rubber cement.

In Figure 6 is shown a rubber heel constructed in accordance with this invention. In this case the rubber heel will not be sewed on so that the cushioning layer 27 of substantially pure rubber may be thicker and it is only necessary to bevel this layer at the edge to keep it from being too conspicuous. The harder non-stretching layer 28 and cement receptive layer 29 are provided as before so that the rubber heel may be cemented to the heel block 30 of the shoe.

In Figure 7 is shown a modification in which a non-stretching sheet, such as 13, is backed by a sheet of raw rubber 31 secured to the non-stretching sheet by the cement 18. This construction, like the others, provides a cement receptive coating or cover for the back of the non-stretching sheet since raw rubber is essentially cement receptive.

In all forms it is to be understood that the cushioning or tread layer and the backing or non-stretching layer are vulcanized together. Also the cement receptive layer may be applied in any desired manner as for instance in a layer as shown in my prior patent aforesaid or in a film deposited from rubber cement as taught by my copending application above mentioned.

From the foregoing it will be seen that that side of the film of raw rubber deposited by the rubber dissolved by cement (consisting of rubber dissolved in gasoline or similar solvent) will become so well united to the back of the sole itself that the two will not separate or peel apart under the flexing strains of shoe use.

This feature is obtained upon application of rubber cement to the sole proper (a) either before the sole proper is vulcanized and with the rubber cement going through the heat and pressure along with the sole and becoming united by vulcanization—or (b) applying rubber cement while the sole proper is still hot from the vulcanizing and is, therefore, giving off some of the sulphur fumes, which produce vulcanization and with the result of a certain adhesion coming about by contact with these fumes—(c) applying the rubber cement while the back of the sole proper has not yet been fully secured and tightened up by air drying, the result being that the solvent itself to a moderate extent attacks the fresh rubber and a union is effected that may be actual vulcanization or penetration, or a union that is superior to applying the cement after the back of the sole proper has been tightened up by time and air.

The only other equation is that the surface or exposed side of the film of raw rubber deposited by the cement must remain in such a condition that when fresh rubber cement is applied to it, the solvent will partially dissolve the raw rubber backing, with the result that the two raw rubber films become homogeneous and inseparable.

It is not necessary that the face of the first applied raw rubber film be actually tacky or sticky to the feel; for example, a sheet of raw rubber that has been kept away from the air by Holland cloth or paper will feel somewhat tacky when you first remove the sheet, but if you lay it in the air for a day or less, it will lose this tackiness so far as the feel goes, but the minute a solvent is put on it, it becomes tacky.

Consequently, the union is made at any time that a solvent will make the raw rubber tacky, whether it was tacky to the feel before applying it or not.

Again it is evident that if we have a surface of raw rubber that will become tacky upon the application of solvent, we then have a condition under which any number of other coats of cement or of sheets of raw rubber, freshened with solvent or applied by cement, can be added thereto.

What is claimed, is:

1. A rubber ground engaging member for shoes having a tread layer of substantially pure rubber having a high cushioning effect, said layer having a tread receiving portion of sufficient thickness to develop high cushioning under use and having a marginal portion having a thickness constituting a minor fraction of the thickness of the tread receiving portion, said marginal portion being offset away from the ground engaging face of said member.

2. A rubber ground engaging member for shoes having a tread layer of substantially pure rubber having a high cushioning effect and having a molecular structure of great cohesion and high resistance to spreading under pressure, said layer having an extremely thin marginal portion, said marginal portion being offset above the ground engaging face of said member.

3. A rubber ground engaging member for shoes having a tread layer of substantially pure rubber having a high cushioning effect and having a structure of high molecular cohesion and great resistance to spreading under pressure, said layer having an extremely thin marginal portion offset upwardly from the ground engaging face of said layer, said member further having a backing layer of substantially non-stretchable rubber vulcanized thereto and positioned to lie next the shoe to which the member is to be attached.

4. A rubber ground engaging member for shoes having a tread layer of substantially pure rubber having a high cushioning effect and a tight structure, said layer having a tread receiving portion of sufficient thickness to develop high cushioning under use and having a marginal portion having a thickness constituting a minor fraction of the thickness of the tread receiving portion and offset upwardly from the ground engaging face of said layer, said member further having a backing layer of substantially non-stretchable rubber vulcanized thereto and positioned to lie next the shoe to which the member is to be attached, said backing layer being of relatively hard rubber composition and the tread layer being relatively soft.

5. A rubber ground engaging member for shoes having a tread layer of substantially pure rubber having a high cushioning effect and a tight structure, said layer having a tread receiving portion of sufficient thickness to develop high cushioning under use and having a marginal portion having a thickness constituting a minor fraction of the thickness of the tread receiving portion offset upwardly from the ground engaging surface of the tread layer, said member further having a backing layer of substantially non-stretchable rubber vulcanized thereto and positioned to lie next the shoe to which the member is to be attached, said backing layer being of relatively hard rubber composition and the tread layer being relatively soft with the two layers coterminous at their peripheries.

6. A rubber ground engaging member for shoes having a tread layer of substantially pure rubber having a high cushioning effect and a tight structure, said layer having an extremely thin marginal portion offset upwardly from the ground engaging surface of the tread layer, said member further having a backing layer of substantially non-stretchable rubber vulcanized thereto and positioned to lie next the shoe to which the member is to be attached, said backing layer being of relatively hard rubber composition and the tread layer being relatively soft with the two layers coterminous at their peripheries.

7. A rubber ground engaging member for shoes having a tread layer of substantially pure rubber having a high cushioning effect and a tight structure, said layer having a tread receiving portion of sufficient thickness to develop high cushioning under use and having a marginal portion offset upwardly from the ground engaging surface of said member and having a thickness constituting a minor fraction of the thickness of the tread receiving portion, said member further having a backing layer of substantially non-stretchable rubber vulcanized thereto and positioned to lie next the shoe to which the member is to be attached, the backing layer having an exposed cement receptive face.

8. A rubber ground engaging member for shoes having a tread layer of substantially pure rubber having a high cushioning effect, said layer having a tread receiving portion of sufficient thickness to develop high cushioning under use and having a marginal portion offset upwardly from the ground engaging surface of said member and having a thickness constituting a minor fraction of the thickness of the tread receiving portion, said member further having a backing layer of substantially non-stretchable rubber vulcanized thereto and positioned to lie next the shoe to which the member is to be attached, said tread layer having a hardness substantially half that of the backing layer.

9. A rubber ground engaging member for shoes having a tread layer of substantially pure rubber having a tigh cushioning effect and a tight structure, said layer having a tread receiving portion of sufficient thickness to develop high cushioning under use and having a marginal portion having a thickness constituting a minor fraction of the thickness of the tread receiving portion offset upwardly from the ground engaging surface of the tread layer, said member further having a backing layer of substantially non-stretchable rubber vulcanized thereto and positioned to lie next the shoe to which the member is to be attached, said backing layer being of relatively hard rubber composition and the tread layer being relatively soft, said member further having a raw rubber layer cemented to the side of the backing layer opposite the tread layer.

10. A rubber ground engaging member for shoes having a tread layer of substantially pure rubber, said layer having a tread receiving portion of sufficient thickness to develop high cushioning under use and having a marginal portion having a thickness constituting a minor fraction of the thickness of the tread receiving portion, said marginal portion being offset upwardly from the ground engaging face of the tread layer.

11. A rubber ground engaging member for shoes having a tread layer of substantially pure rubber, said layer having an extremely thin marginal portion, said marginal portion being offset upwardly from the ground engaging face of the tread layer.

12. A rubber ground engaging member for shoes having a tread layer of substantially pure rubber, said layer having a tread receiving portion of sufficient thickness to develop high cushioning under use and having a marginal portion having a thickness constituting a minor fraction of the tread receiving portion, said marginal portion being offset upwardly from the ground engaging face of the tread layer, said member further having a backing layer of substantially non-stretchable rubber vulcanized thereto and positioned to lie next the shoe to which the member is to be attached.

13. A rubber ground engaging member for shoes having a tread layer of substantially pure rubber, said layer having a tread receiving portion of sufficient thickness to develop high cushioning under use and having a marginal portion having a thickness constituting a minor fraction of the thickness of the tread receiving portion, said marginal portion being offset upwardly from the ground engaging face of the tread layer, said member further having a backing layer of substantially non-stretchable rubber vulcanized thereto and positioned to lie next the shoe to which the member is to be attached, said backing layer being of relatively hard rubber composition and the tread layer being relatively soft, said member further having a raw rubber layer cemented to the side of the backing layer opposite the tread layer.

ALBERT L. MURRAY.